United States Patent [19]

Michaud et al.

[11] 4,158,862
[45] Jun. 19, 1979

[54] SELECTIVE FIXATION METHOD FOR PRODUCING PERMANENT MAGNETIC RECORDINGS

[75] Inventors: André Michaud; Pierre Eymard, both of Chatenay Malabry, France

[73] Assignee: Transac — Compagnie pour le Developpement des Transactions Automatiques, Paris, France

[21] Appl. No.: 846,088

[22] Filed: Oct. 27, 1977

[30] Foreign Application Priority Data

Nov. 4, 1976 [FR] France .................... 76 33331

[51] Int. Cl.² ............. G11B 13/04; G11B 5/02; G03G 19/00
[52] U.S. Cl. .................... 360/56; 340/149 A; 346/74.1
[58] Field of Search ........... 346/74.1, 160; 360/56; 235/61.11 D; 340/149 A

[56] References Cited

U.S. PATENT DOCUMENTS

| 3,662,397 | 5/1972 | Ballinger | 360/56 |
| 3,803,633 | 4/1974 | Duck | 360/56 |
| 3,845,499 | 10/1974 | Ballinger | 360/56 |
| 3,873,975 | 3/1975 | Miklos | 340/149 A |
| 3,878,367 | 4/1975 | Fayling | 360/56 |
| 3,947,879 | 3/1976 | Stauffer | 360/56 |

Primary Examiner—Jay P. Lucas
Attorney, Agent, or Firm—Sughrue, Rothwell, Mion, Zinn and Macpeak

[57] ABSTRACT

Permanent magnetic recordings are made by orienting the magnetic particles of a polymerizable ink in a first direction, then selectively polymerizing the ink to fix some of the particles in the first direction. The remaining particles are then oriented in a second direction and the previously unpolymerized portions of the ink are polymerized, while the ink is kept in a magnetic field tending to orient the particles in the second direction to prevent the particles fixed in the first direction from blurring the magnetic pattern before the polymerization is effective to lock it in completely. Such recordings are particularly useful for ID cards.

7 Claims, 1 Drawing Figure

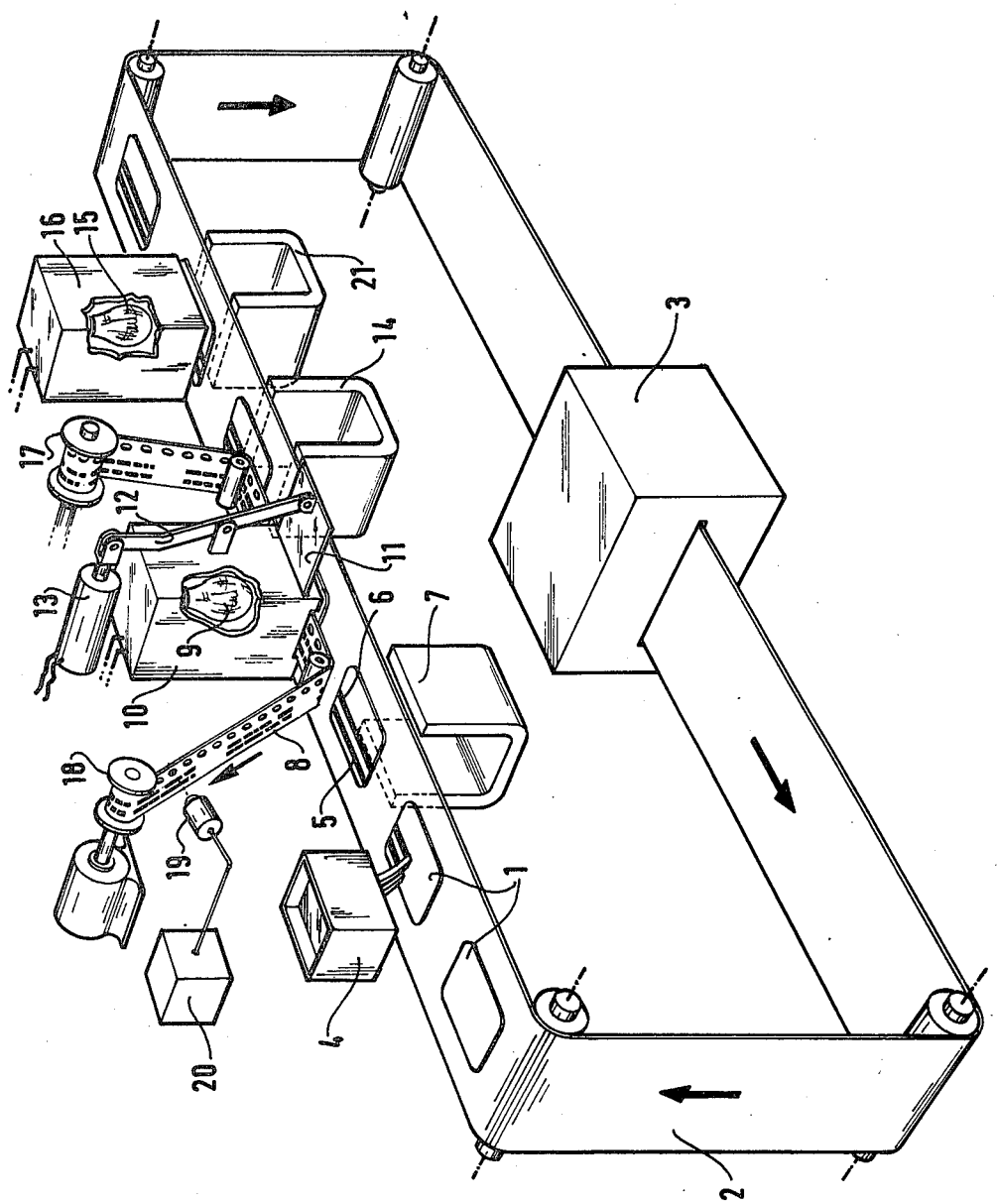

SELECTIVE FIXATION METHOD FOR PRODUCING PERMANENT MAGNETIC RECORDINGS

BACKGROUND OF THE INVENTION

The magnetic recording of information is a well-known and widely used method. Depending on the application, the information is recorded on tape or rigid or flexible cards or discs, and in analogue or digital form. Analogue recording is used for sound reproduction, for example, and digital recording in data processing.

The recording methods currently in use enable the recording media to be re-used many times over, each new recording erasing and replacing the previous one.

This fundamental characteristic of current methods is sometimes an advantage, but it can also be a disadvantage. If applied to certain types of document, such as credit cards or passports, for example, these methods do not result in sufficient resistance to accidental or intentional interference with the recorded information.

A method of making permanent magnetic recordings is known in which a support is provided with layer of anisotropic magnetisable particles which are uniformly distributed in a flexible binder and mixed with a solvent. All the particles are then oriented in a predetermined direction by means of a magnetic field and then the particles in certain zones corresponding to the configuration of the message to be recorded are selectively oriented in a perpendicular direction, by means of small discrete magnets for example. The layer is then dried by heating to evaporate the solvent and to fix the particles in position. Such a method is described in U.S. Pat. No. 3,873,975.

However, in this method of selective orientation, unfixed and differently oriented particles coexist adjacent each other in the same layer before drying. These particles exert forces on each other tending to rotate the particles before they are fixed, thereby causing indistinct boundaries between zones of different orientation.

SUMMARY OF THE INVENTION

Preferred embodiments of the present invention mitigate this disadvantage, and the present invention provides a method for producing permanent magnetic recordings, wherein the method comprises the steps of:
(a) coating a support with a polymerizable magnetic ink;
(b) while the ink is still fluid, orienting the magnetic particles contained in the ink in a pre-determined direction by means of a magnetic field;
(c) selectively polymerizing, by irradiation, certain areas of the magnetic ink coating corresponding to parts of the recorded message which are to have the magnetic orientation imposed in step (b);
(d) orienting the magnetic particles in the unpolymerized areas of the magnetic ink coating in a direction different from that imposed in step (b), by means of a magnetic field; and
(e) polymerizing, by irradiation, at least those areas of the magnetic ink coating not polymerized in step (c), while keeping the particles in a magnetic field as used in step (d).

The polymerization of the steps (c) and (e) may be advantageously achieved by means of ultra-violet radiation.

The invention thus solves the problem by using selective drying instead of selective orientation of the particles before drying. The particles fixed selectively by step (c) can no longer move during the orientation of the free particles in the different direction of step (d) and since the particles are kept in a magnetic field during the polymerization of step (e) the particles re-oriented in step (d) are not influenced by the particles fixed during step (c).

In a preferred embodiment of the present invention, the orientation of the magnetic particles imposed in step (d) is perpendicular to that imposed in step (b).

In another preferred embodiment of the invention, the orientation of the magnetic particles imposed in step (d) is at an angle of 180° to that imposed in step (b).

In one embodiment of the present invention, the selective polymerization of step (c) is achieved by the projection of ultra-violet radiation onto a mask located above said support and incorporating areas transparent to ultra-violet radiation and corresponding to the areas to be polymerized.

In another embodiment of the present invention, the selective polymerization of step (c) is achieved by means of an ultraviolet laser and a control system for scanning the laser beam over the areas to be polymerized and for varying the intensity of the beam.

The method in accordance with the invention therefore enables the magnetic particles in different areas of a magnetic ink coating on a support to be oriented in significantly different directions, so as to produce a permanent magnetically recorded message which cannot be altered, even if the magnetic orientations of the particles in the different areas are subsequently slightly modified for any reason.

Other characteristics and advantages of the invention will emerge from the following description of an embodiment thereof. This description is given by way of non-limiting example only and with reference to the accompanying drawing, which comprises a single perspective view of the apparatus for practicing the method of the present invention.

DESCRIPTION OF THE PREFERRED EMBODIMENT

Referring to the figure, the supports which are to receive a magnetically recorded message consist of credit cards 1 which are passed through five stations corresponding to the five steps of the method in accordance with the invention on a conveyor belt 2. The belt advances in steps of fifteen centimetres. Each advance takes 0.5 seconds, and the belt is halted for 0.5 seconds between successive advances. The drive and control system for the conveyor belt is shown schematically at 3.

The first station to which a card 1 is passed includes a container 4 for a magnetic ink which can be polymerized by ultra-violet radiation. A suitable ink is that marketed by the Brancher company under the reference U604. This ink lends itself to rapid and localised hardening. The container includes means (not shown) for controlling the flow of ink. In this example, ink is supplied to each of two tracks 5 and 6. The tracks are eight millimetres wide, and the thickness of the magnetic ink coatings is four microns. The card 1 is then passed to the second station, in which the magnetic particles in suspension in the ink, which is still fluid, are oriented in a first direction. This is achieved by means of a transverse magnetic field applied by a magnet 7.

After this initial orientation of the magnetic particles contained in the ink coating of the two tracks 5 and 6, the card is passed to the third station which includes a mask 8 which is located over tracks 5 and 6. The mask 8 consists of a length of Kodak 'Plus-X' photographic film with transparent and opaque areas in a coded layout corresponding to the message to be recorded on the card 1. A source 9 of ultra-violet radiation, with an output of eighty watts, illuminates and polymerizes the areas of the ink coating exposed by the transparent areas in the mask 8, so that the magnetic orientation of the particles in these areas of the coating is set in a permanent manner. The areas which are not exposed to the ultra-violet radiation remain fluid. Tests have indicated that an exposure time of 0.1 seconds gives good results.

The ultra-violet source 9 is enclosed in a casing 10 with a sliding base 11 operated by a mechanical linkage 12 actuated by an electro-magnet 13. In the circumstances as just described, polymerization occurs after about 0.75 seconds at 20° C.

The information to be magnetically recorded in tracks 5 and 6 generally differs from one card to the next, and for this reason it is advantageous to use a continuous strip of 35 mm film for the mask 8, the film comprising the successive blocks of information to be recorded on the successive cards. The pitch of the sprocket holes in the film is 4.73 mm, so that for cards 8.5 cm long the film may be advanced by 20 sprocket holes (9.46 cm). The film is advanced each time the next card is to receive a message different from that for the preceding card. Generally speaking, the film will need to be advanced for each card.

The mask 8 is unwound from a feed spool 17 and wound onto a take-up spool 18. The advance and positioning of the 35 mm film is controlled by means of a photosensor 19 aligned with the sprocket holes. The pulses generated by the photosensor are fed to electronic control circuitry 20 including pulse-shaping circuits.

Following this selective polymerization operation, the cards 1 are passed in succession to the fourth station, which includes a magnet 14 perpendicular to the magnet 7. Thus the magnetic particles in the unpolymerized areas of the ink coating are oriented in a direction at right angles to that of the particles in the areas which have just been polymerized. The two directions in which the particles are oriented need not be perpendicular, as in this example. One can be the opposite of the other, for example, or any two orientations can be used provided that the angle between them is at least 30° or thereabouts.

The cards then pass to the fifth station in which the unpolymerized portions of the ink coating are polymerized. This is achieved by means of an ultral-violet source 15 identical to the source 9, enclosed in a housing 16 which is open at the bottom. The recording tracks 5 and 6 are exposed to the ultraviolet radiation without the use of a mask, which has the effect of polymerizing the areas which were not polymerized at the third station but does not affect the areas which were polymerized at the third station. During polymerization, the magnetic particles are kept in a magnetic field identical to that of the magnet 14 by mens of an identical magnet 21 disposed in parallel to the magnet 14.

The end result is a card with two magnetically recorded tracks consisting of a succession of zones in which the magnetic particles are oriented longitudially or transversely, in accordance with the recorded message and the code used for the message.

The messages recorded by this method may be read by the kinds of reading head commonly used in the art.

The third station, i.e., the selective polymerization station with the 35 mm film mask 8, may be replaced with an ultra-violet laser with means for scanning the beam transversely across the tracks on the cards and/or means for modulating the intensity of the laser beam. This method enables any of the coding methods used in the electronics art to be used for recording the messages on the cards. Longitudinal scanning is provided by the advance of the cards on the conveyor belt 2, which in this case would run continuously, rather than intermittently.

This modified method of putting the invention into practice can be applied to continuous magnetic media such as magnetic tapes, and can be used for analogue recording, for sound reproduction, for example, and for digital recording, for data processing, for example.

It will be understood that the embodiment of the invention described is a non-limiting example only and that, without departing from the scope of the invention, it is possible to change the numerical values specified and to replace the specified component parts with other fulfilling the same functions. Likewise, the use of an ink polymerizable by ultraviolet radiation is only an example and any other suitable product and associated type of irradiation may be substituted.

What we claim is:

1. A method for producing permanent magnetic recordings, said method comprising the steps of:
   (a) coating a support with a polymerizable magnetic ink;
   (b) while the ink is still fluid, subjecting the magnetic ink to a magnetic field to orient the magnetic particles contained in the ink in a predetermined direction;
   (c) selectively polymerizing, by irradiation, certain areas of the magnetic ink coating corresponding to parts of the recorded message which are to have the magnetic orientation imposed in step (b);
   (d) subjecting the magnetic ink to a differently oriented magnetic field to orient the magnetic particles in the unpolymerized areas of the magnetic ink coating in a direction different to that imposed in step (b); and
   (e) polymerizing, by irradiation, at least those areas of the magnetic ink coating not polymerized in step (c) while maintaining the particles in a magnetic field having the same orientation as that used in step (d).

2. A method according to claim 1, wherein the orientation of the magnetic particles imposed in step (d) is perpendicular to that imposed in step (b).

3. A method according to claim 1, wherein the orientation of the magnetic particles imposed in step (d) is at an angle of 180° to that imposed in step (b).

4. A method according to claim 1, wherein said irradiation of the magnetic ink is by ultra-violet radiation.

5. A method according to claim 4, wherein said step (c) of selective polymerization comprises projecting ultra-violet radiation onto a mask located above said support having areas transparent to ultra-violet radiation corresponding to the areas to be polymerized.

6. A method according to claim 4, wherein said step (c) of selective polymerization comprises scanning an ultra-violet laser beam over the areas to be polymerized and varying the intensity of the beam.

7. A magnetic recording medium, comprising a support and at least one magnetic track on said support at least partially recorded by the method comprising the steps of:
(a) coating said support with a polymerizable magnetic ink;
(b) while the ink is still fluid, subjecting the magnetic ink to a magnetic field to orient the magnetic particles contained in the ink in a predetermined direction;
(c) selectively polymerizing, by irradiation, certain areas of the magnetic ink coating corresponding to parts of the recorded message which are to have the magnetic orientation imposed in step (b);
(d) subjecting the magnetic ink to a differently oriented magnetic field to orient the magnetic particles in the unpolymerizable areas of the magnetic ink coating in a direction different to that imposed in step (b); and
(e) polymerizing, by irradiation, at least those areas of the magnetic ink coating not polymerized in step (c) while maintaining the particles in a magnetic field having the same orientation as that used in step (d).

* * * * *